US008516276B2

(12) United States Patent
Kim et al.

(10) Patent No.: US 8,516,276 B2
(45) **Date of Patent: *Aug. 20, 2013**

(54) APPARATUS AND METHOD FOR CONTROLLING POWER SUPPLIED TO FIXING UNIT

(75) Inventors: Jin-ha Kim, Seongnam-si (KR); Joong-gi Kwon, Gunpo-si (KR); Jong-moon Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 549 days.

This patent is subject to a terminal disclaimer.

(21) Appl. No.: 12/656,220

(22) Filed: Jan. 21, 2010

(65) Prior Publication Data

US 2010/0125375 A1 May 20, 2010

Related U.S. Application Data

(63) Continuation of application No. 11/588,309, filed on Oct. 27, 2006, now Pat. No. 7,721,121.

(30) Foreign Application Priority Data

Apr. 3, 2006 (KR) ................................ 2006-30150

(51) Int. Cl.
*G06F 1/26* (2006.01)

(52) U.S. Cl.
USPC .............................. 713/300; 713/400; 399/67

(58) Field of Classification Search
USPC .................. 713/300, 400; 399/67, 69, 70, 88
See application file for complete search history.

(56) References Cited

U.S. PATENT DOCUMENTS

| | | | |
|---|---|---|---|
| 4,928,055 | A | 5/1990 | Kaieda et al. |
| 5,669,038 | A | 9/1997 | Kishimoto |
| 6,301,454 | B1 | 10/2001 | Nishida |
| 6,522,844 | B2 | 2/2003 | Yamane et al. |
| 6,931,222 | B2 | 8/2005 | Okada |
| 6,943,326 | B2 | 9/2005 | Hirst |
| 7,295,289 | B2 | 11/2007 | Rolon et al. |

FOREIGN PATENT DOCUMENTS

| | | |
|---|---|---|
| CN | 1704856 | 12/2005 |
| JP | 2000276000 A | 10/2000 |
| JP | 2000330418 A | 11/2000 |
| JP | 2001-005537 | 1/2001 |
| JP | 2002-296954 | 10/2002 |
| JP | 2003-345171 | 12/2003 |

(Continued)

*Primary Examiner* — Kim Huynh
*Assistant Examiner* — Zahid Choudhury
(74) *Attorney, Agent, or Firm* — Roylance, Abrams, Berdo & Goodman, L.L.P.

(57) ABSTRACT

An apparatus and method for controlling the power supplied to a fixing unit are provided. The apparatus includes a voltage detector detecting a voltage of input power supplied to heat at least one heating lamp, a synch signal generator generating a synch signal in response to the detected voltage, a switching unit switching a supply path of the input power to be applied to the at least one heating lamp, and a controller having table information of temporal duty level values of the input power that is initially supplied, and outputting a control signal for controlling a switching operation of the switching unit using the generated synch signal and the table information, wherein the switching unit performs the switching operation corresponding to the control signal. Accordingly, by sequentially increasing the input power for initial heating of the heating lamps, flickering and harmonic characteristics of a display device can be reduced, and by setting the duty level values to supply the maximum input power within a certain time, an initial heating time of the heating lamps can be minimized.

4 Claims, 3 Drawing Sheets

(56) References Cited

FOREIGN PATENT DOCUMENTS

| | | | |
|---|---|---|---|
| JP | 2004-021250 | | 1/2004 |
| JP | 2004-212510 | | 7/2004 |
| JP | 2004303466 | A | 10/2004 |
| JP | 2004-343821 | | 12/2004 |
| JP | 2005-091965 | A | 4/2005 |
| JP | 2005-107048 | A | 4/2005 |

APPARATUS AND METHOD FOR CONTROLLING POWER SUPPLIED TO FIXING UNIT

CROSS-REFERENCE TO RELATED APPLICATIONS

This application is a continuation application under 35 U.S.C. §120 of U.S. Non-provisional application Ser. No. 11/588,309, filed on Oct. 27, 2006 now U.S. Pat. No. 7,721,121 in the U.S. Patent and Trademark Office, the entire disclosure of which is incorporated herein by reference. Additionally, this application claims the benefit under 35 U.S.C. §119(a) of Korean Patent Application No. 10-2006-0030150, filed on Apr. 3, 2006, in the Korean Intellectual Property Office, the entire disclosure of which is hereby incorporated by reference.

BACKGROUND OF THE INVENTION

1. Field of the Invention

The present invention relates to a device in which a load is supplied using alternating current (AC) power. More particularly, the present invention relates to an apparatus and method for controlling power supplied to a fixing unit to reduce an instantaneous heating time of the fixing unit and a flicker characteristic.

2. Description of the Related Art

A conventional fixing circuit for laser printers and photocopiers includes a controller for determining whether power is supplied to a fixing unit, a triac switching unit for supplying alternating current (AC) power to the fixing unit, and a triac driver for controlling the triac.

The conventional fixing circuit controller controls the fixing unit by receiving AC power from an input power supply and applying the AC power to components of the fixing unit. That is, the controller detects a temperature of the fixing unit using a temperature sensor, outputs a switch-on signal if it is determined that a temperature increase is needed, and applies the AC power to the fixing unit by activating the triac to an on-state at a zero-crossing time in every switching period using a photo triac in response to the switch-on signal.

As described above, in the conventional fixing circuit, since the controller simply controls the triac switching unit in order to control the temperature of the fixing unit, without having information on the AC power, such as information on a voltage synch angle of the AC power, irregular turn-on timing causes flickering of a display device using the same power source as an image forming device.

In addition, to reduce a print ready time, a supply of relatively high power may be needed in an initial warm-up of a fixing unit. However, this power increase causes an excessive inrush current, resulting in more pronounced flickering and a harmonic characteristic of the display device.

Accordingly, there is a need for an improved apparatus and method for controlling power supplied to a fixing unit.

SUMMARY OF THE INVENTION

Exemplary embodiments of the present invention address at least the above problems and/or disadvantages and provide at least the advantages described below. Accordingly, an aspect of the present invention is to provide an apparatus and method for controlling the power supplied to a fixing unit in order to reduce an instantaneous heating time of the fixing unit and reduce flickering of a display device using the same power source as an image forming device.

According to an exemplary aspect of the present invention, there is provided an apparatus for controlling the power supplied to a fixing unit, the apparatus comprising a voltage detector for detecting a voltage of an input power supplied to heat at least one heating lamp, a synch signal generator for generating a synch signal in response to the detected voltage, a switching unit for switching a supply path of the input power to be applied to the at least one heating lamp and a controller having table information of temporal duty level values of the input power that is initially supplied for outputting a control signal for controlling a switching operation of the switching unit using the generated synch signal and the table information, wherein the switching unit performs the switching operation corresponding to the control signal.

According to another exemplary aspect of the present invention, there is provided a method of controlling the power supplied to a fixing unit, the method comprising detecting a voltage of an input power supplied to heat at least one heating lamp, generating a synch signal in response to the detected voltage, outputting a control signal for controlling a switching operation of a switching unit using the generated synch signal and table information of temporal duty level values of the input power that is initially supplied and performing the switching operation by the switching unit.

BRIEF DESCRIPTION OF THE DRAWINGS

The above and other features and advantages of the present invention will become more apparent by describing in detail exemplary embodiments thereof with reference to the attached drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described more fully with reference to the accompanying drawings.

Figure 1:
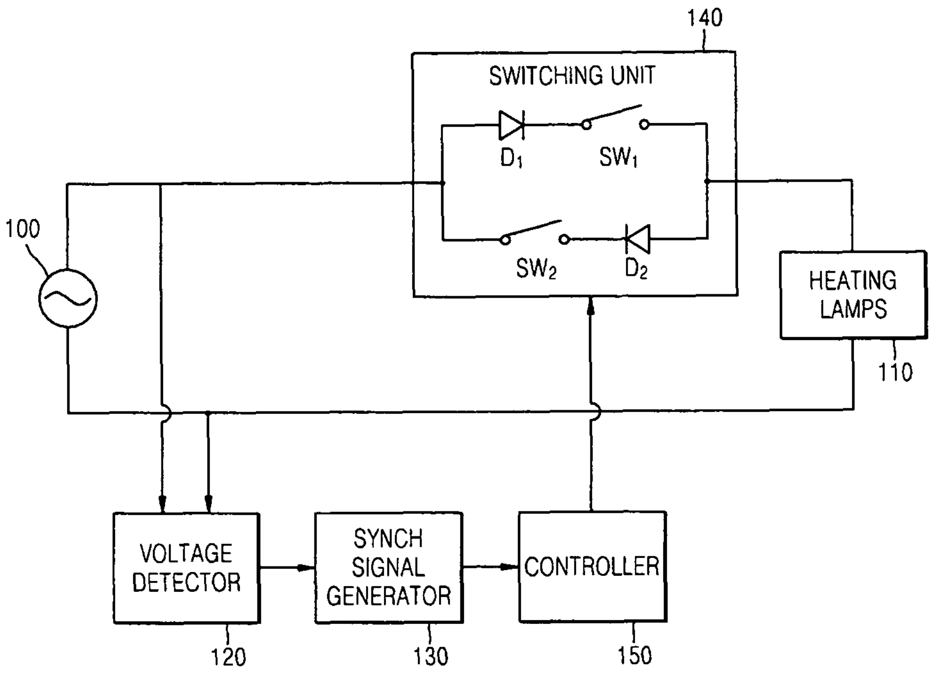
FIG. 1 is a block diagram of an apparatus for controlling the power supplied to a fixing unit according to an exemplary embodiment of the present invention.

FIG. 1 is a block diagram of an apparatus for controlling the power supplied to a fixing unit according to an exemplary embodiment of the present invention. Referring to FIG. 1, the apparatus includes a power supply 100, heating lamps 110, a voltage detector 120, a synch signal generator 130, a switching unit 140, and a controller 150.

The power supply 100 supplies alternating current (AC) power as input power for heating the heating lamps 110.

The heating lamps 110 are used to heat a heating roller (not shown) of the fixing unit. Typically, halogen lamps are used as the heating lamps 110 but other types of lamps may also be used. The number of heating lamps 110 is at least one. The heating lamps 110 may be connected to one another serially or in parallel. In an alternative exemplary embodiment, the heating lamps 110 may be replaced with a different load.

The voltage detector 120 detects an input voltage of the input power supplied by the power supply 100 and outputs a detection result to the synch signal generator 130.

The synch signal generator 130 generates a synch signal corresponding to the input voltage detected by the input voltage detector 120 and outputs the generated power synch signal to the controller 150. The synch signal generator 130 generates a pulse signal synchronizing with a zero-crossing time of the input power as the synch signal.

The switching unit 140 performs a switching operation to supply the input power provided by the power supply 100 to the heating lamps 110. The switching unit 140 performs the switching operation corresponding to a control signal of the controller 150. The switching unit 140 comprises at least one self turn-off switching component. The switching unit 140 comprises at least one diode connected in series to the at least one self turn-off switching component.

Unlike a triac, a self turn-off switching component can perform an on switching operation or an off switching operation in response to a control signal. As illustrated in FIG. 1, the switching unit 140 comprises a first self turn-off switching component $SW_1$ and a second self turn-off switching component $SW_2$. The first self turn-off switching component $SW_1$ and the second self turn-off switching component $SW_2$ are connected in parallel. The self turn-off switching components may comprise a bipolar or field effect transistor or other self turn-off switches.

The switching unit 140 also comprises a first diode $D_1$ and a second diode $D_2$. The first diode $D_1$ is connected in series to the first self turn-off switching component $SW_1$, and the second diode $D_2$ is connected in series to the second self turn-off switching component $SW_2$. The first diode $D_1$ and the first self turn-off switching component $SW_1$ are switching components for supplying the input power, a phase angle of which is within a range between 0° and 180°. The second diode $D_2$ and the second self turn-off switching component $SW_2$ are switching components for supplying the input power, a phase angle of which is within a range between 180° and 360°.

The controller 150 has table information of temporal duty level values for the input power that is initially supplied. The controller 150 outputs a control signal for controlling the switching operation of the switching unit 140 to the switching unit 140 using the generated synch signal generated by the synch signal generator 130 and the table information.

In the table information, duty level values are continuously increased for an initial time for which the input power is supplied. When the initial time has elapsed during which the duty level values are being continuously increased, the table information reaches the maximum duty level value. Although the initial time can vary, in an exemplary embodiment, the initial time is set to a value between 1 second and 2 seconds in order to minimize an initial heating time of the heating lamps 110.

Table 1 illustrates the table information.

TABLE 1

| Time interval [sec] | Duty level value [%] | Switching component |
|---|---|---|
| 0~1/120 | 5 | $SW_1$ |
| 1/120~2/120 | 7 | $SW_2$ |
| 2/120~3/120 | 10 | $SW_1$ |
| . . . | . . . | . . . |
| 118/120~119/120 | 95 | $SW_1$ |
| 119/120~120/120 | 100 | $SW_2$ |

Table 1 illustrates table information of increasing duty level values when it is assumed that a time required to increase an input power having a 60 Hz frequency to the maximum value, in other words, the initial time, is 1 second (=120/120).

As illustrated in Table 1, the controller 150 controls a switching operation of the first self turn-off switching component $SW_1$ so that a duty level value of the input power is 5% from 0 to 1/120 second. The controller 150 controls a switching operation of the second self turn-off switching component $SW_2$ so that a duty level value of the input power is 7% from 1/120 to 2/120 second. Likewise, the controller 150 alternately controls the first self turn-off switching component $SW_1$ and the second self turn-off switching component $SW_2$ according to duty level values until 1 second elapses after the input power is supplied.

Figure 2:
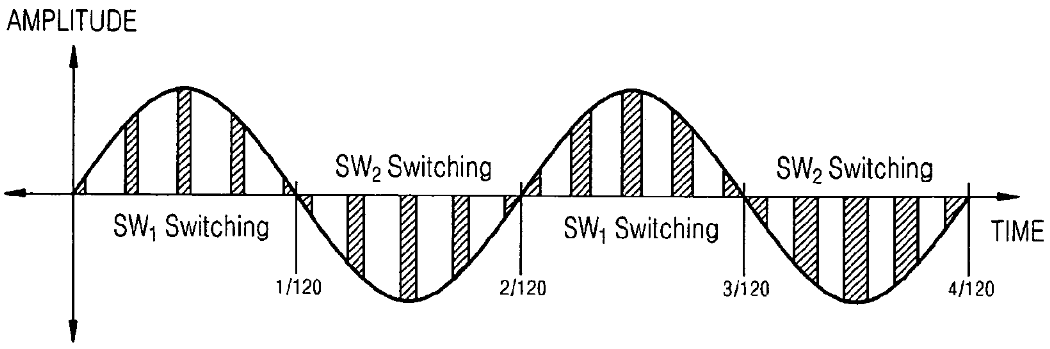
FIG. 2 is a waveform diagram illustrating a variation of duty level values of an input power according to an exemplary embodiment of the present invention.

FIG. 2 is a waveform diagram illustrating a variation of duty level values of an input power according to an exemplary embodiment of the present invention. In FIG. 2, a phase angle range between 0° and 180° of the input power corresponds to a time range between 0 and 1/120 second, and a phase angle range between 180° and 360° of the input power corresponds to a time range between 1/120 and 2/120 second. A sum of shaded areas during the time between 0 and 1/120 second corresponds to the duty level value of 5% of the input power to be supplied to the heating lamps 110 for the time between 0 and 1/120 second. In addition, a sum of shaded areas during the time between 1/120 and 2/120 second corresponds to the duty level value of 7% of the input power to be supplied to the heating lamps 110 for the time between 1/120 and 2/120 second. In addition, a sum of shaded areas during the time between 2/120 and 3/120 second corresponds to a duty level value of 10% of the input power to be supplied to the heating lamps 110 for the time between 2/120 and 3/120 second. Likewise, a sum of shaded areas during a certain time corresponds to a duty level value of the certain time.

The controller 150 can detect a zero crossing time of the input power using the generated synch signal. The controller 150 controls a switching operation of the first self turn-off switching component $SW_1$ or the second self turn-off switching component $SW_2$ every half period, in other words, 0° to 180° or 180° to 360°, of the input power based on the detected zero crossing time. That is, the controller 150 controls the switching operation of the first self turn-off switching component $SW_1$ so that the input power corresponding to the duty level value of 5% is supplied to the heating lamps 110 from 0 to 1/120 second. Thereafter, the controller 150 controls the switching operation of the second self turn-off switching component $SW_2$ so that the input power corresponding to the duty level value of 7% is supplied to the heating lamps 110 from 1/120 to 2/120 second. Thereafter, the controller 150 controls the switching operation of the first self-healing switching component $SW_1$ so that the input power corresponding to the duty level value of 10% is supplied to the heating lamps 110 from 2/120 to 3/120 second. Until the duty level value reaches the maximum value, in other words, 100%, the controller 150 alternately controls the switching operations of the first self turn-off switching component $SW_1$ and the second self turn-off switching component $SW_2$.

Figure 3:
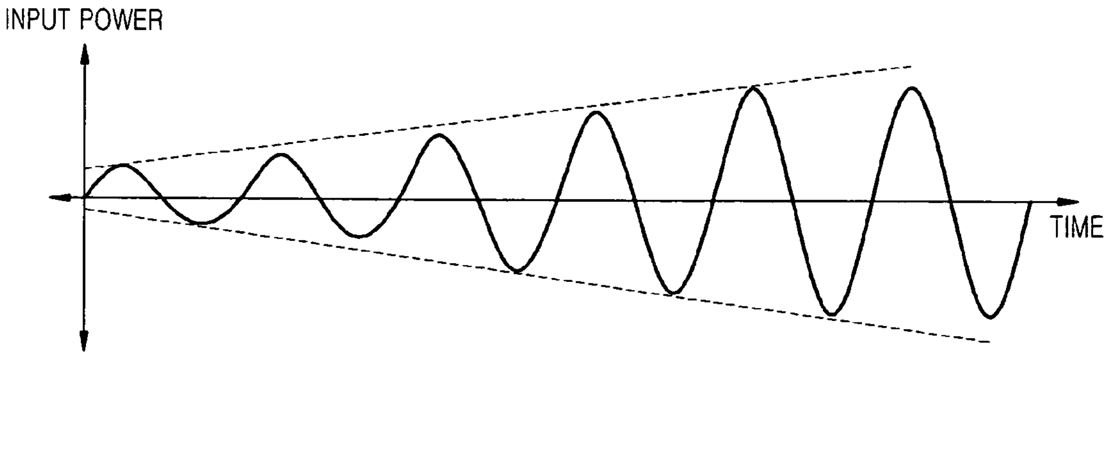
FIG. 3 is a waveform diagram illustrating the amplitude of the input power supplied to heating lamps for an initial time by a controller of FIG. 1, according to an exemplary embodiment of the present invention.

FIG. 3 is a waveform diagram illustrating the amplitude of the input power supplied to the heating lamps 110 for the initial time by the controller 150 of FIG. 1, according to an exemplary embodiment of the present invention. As illustrated in FIG. 3, by controlling the supply of the input power using table information in which duty level values are increased, the input power, which is initially supplied, can be gradually increased and supplied. Thus, according to the gradual increase of the input power that is initially supplied, flickering and harmonic characteristics of a display device, which occur due to an excessive supply of the input power, can be prevented, and by maximizing a duty level value for a time period, the initial heating time of the heating lamps 110 can be minimized.

Figure 4:
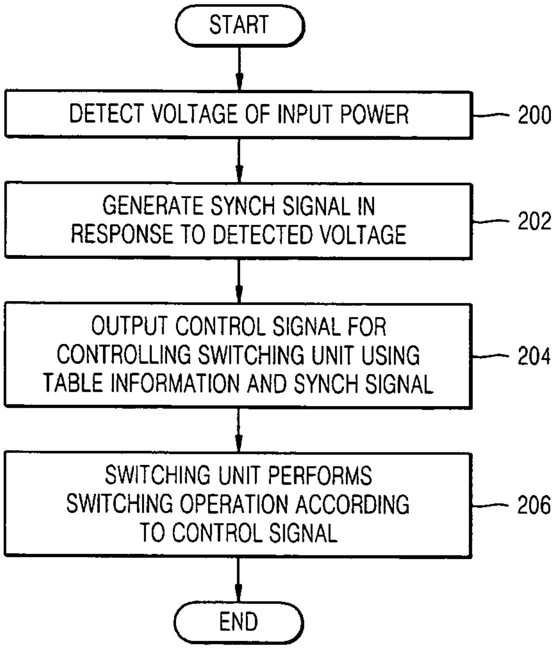
FIG. 4 is a flowchart illustrating a method of controlling the power supplied to a fixing unit according to an exemplary embodiment of the present invention.

FIG. 4 is a flowchart illustrating a method of controlling the power supplied to a fixing unit according to an exemplary embodiment of the present invention.

Referring to FIG. 4, a voltage of an input power supplied to heat the heating lamps 110 is detected in operation 200.

In operation 202, a synch signal of the detected voltage is generated. A pulse signal synchronizing with a zero-crossing time of the input power is generated as the synch signal.

In operation 204, a control signal is output to control a switching operation of the switching unit 140, which switches a supply path of the input power supplied to the heating lamps 110, using the generated synch signal and table information of temporal duty level values of the input power, which is initially supplied. In the table information, duty level values are continuously increased for an initial time for which the input power is supplied.

When the initial time has elapsed while the duty level values are being continuously increased, the table information reaches the maximum duty level value. Although the initial time can vary, in an exemplary embodiment, the initial time is set to a value between 1 second and 2 seconds in order to minimize an initial heating time of the heating lamps 110.

A zero crossing time of the input power can be detected using the generated synch signal. The switching operation of the first self turn-off switching component $SW_1$ or the second self turn-off switching component $SW_2$ illustrated in FIG. 1 is controlled every half period, in other words, 0° to 180° or 180° to 360°, of the input power based on the detected zero crossing time.

As illustrated in FIG. 3, by controlling the supply of the input power using table information in which duty level values are increased, the input power that is initially supplied is gradually increased, and thus, flickering and harmonic characteristics of a display device, which occur due to an excessive supply of the input power, can be prevented, and by maximizing a duty level value for a time period, the initial heating time of the heating lamps 110 can be minimized.

In operation 206, according to the output control signal, the switching unit 140 performs the switching operation. The switching unit 140 comprises at least one self turn-off switching component. Thus, the switching unit 140 can perform an on switching operation or an off switching operation in response to a control signal.

The exemplary embodiments of the present invention can be written as codes/instructions/programs and can be implemented in general-use digital computers that execute the codes/instructions/programs using a computer readable recording medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to exemplary embodiments of the present invention, by applying an input power to heating lamps using table information of temporal duty level values of the input power when the heating lamps are initially heated, the input power for initial heating of the heating lamps can be sequentially increased, thereby reducing flickering and harmonic characteristics of a display device.

In addition, by setting duty level values to supply the maximum input power within a time period, an initial heating time of the heating lamps can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a power supplied to a fixing unit, the apparatus comprising:
- a voltage detector for detecting a voltage of an input power supplied to heat at least one heating lamp;
- a synch signal generator for generating a synch signal as a pulse signal synchronized with a zero crossing time of the detected voltage;
- a switching unit for switching a supply path of the input power to be applied to the at least one heating lamp; and
- a controller having table information of temporal duty level values for the input power that is initially supplied for outputting a control signal for controlling a switching operation of the switching unit using the generated synch signal and the table information,
- wherein the switching unit performs the switching operation corresponding to the control signal, and wherein an increase rate of the temporal duty level values can be changed through a user interface.

2. The apparatus of claim 1, wherein the temporal duty level values reach a maximum value after a predetermined time period.

3. The apparatus of claim 1, wherein the switching unit comprises a first self turn-off switching component and a second self turn-off switching component which are alternately switched every half cycle of the input power in response to the synch signal.

4. The apparatus of claim 1, wherein the controller has a plurality of tables, each table having a different increase rate of the temporal duty level values for the input power that is initially supplied, and outputs a control signal for controlling the switching performed by the switching unit using a table selected from among the plurality of tables and the synch signal.

* * * * *